United States Patent
Misra et al.

(10) Patent No.: US 12,081,809 B2
(45) Date of Patent: Sep. 3, 2024

(54) INCREASING MISSPELLING, TYPOGRAPHICAL, AND PARTIAL SEARCH TOLERANCE FOR SEARCH TERMS

(71) Applicant: AT&T Intellectual Property I, L.P., Atlanta, GA (US)

(72) Inventors: Sanjeev Misra, Somerset, NJ (US); Ann Eileen Skudlark, San Ramon, CA (US); Appavu Siva Prakasam, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 216 days.

(21) Appl. No.: 17/553,948

(22) Filed: Dec. 17, 2021

(65) Prior Publication Data
US 2023/0199232 A1 Jun. 22, 2023

(51) Int. Cl.
*G06F 40/232* (2020.01)
*G06F 40/242* (2020.01)
*H04N 21/232* (2011.01)

(52) U.S. Cl.
CPC ......... *H04N 21/232* (2013.01); *G06F 40/232* (2020.01); *G06F 40/242* (2020.01)

(58) Field of Classification Search
CPC .... H04N 21/232; G06F 40/232; G06F 40/242
See application file for complete search history.

(56) References Cited

U.S. PATENT DOCUMENTS

| | | | | |
|---|---|---|---|---|
| 8,458,156 | B1 * | 6/2013 | Sharifi | G06F 16/48 707/715 |
| 8,881,005 | B2 * | 11/2014 | Al Badrashiny | G06F 40/232 715/257 |
| 8,918,382 | B1 * | 12/2014 | Sharifi | G06F 16/78 707/715 |
| 9,002,866 | B1 * | 4/2015 | Brunsman | G06F 40/295 707/758 |
| 9,075,898 | B1 * | 7/2015 | Ayzenshtat | G06F 16/3322 |
| 11,151,317 | B1 * | 10/2021 | Singh | G06F 40/232 |
| 2014/0281943 | A1 * | 9/2014 | Prilepov | G06F 40/232 715/257 |
| 2015/0213140 | A1 * | 7/2015 | Volkert | G06F 16/9535 707/727 |
| 2016/0364992 | A1 * | 12/2016 | Krishnamurthy | G09B 5/06 |
| 2018/0239741 | A1 * | 8/2018 | Agarwal | G06F 16/313 |

(Continued)

*Primary Examiner* — Anil K Bhargava
(74) *Attorney, Agent, or Firm* — Hartman & Citrin LLC

(57) ABSTRACT

Concepts and technologies disclosed herein are directed to increasing misspelling, typographical, and partial search tolerance for search terms. A system can obtain media content metadata associated with media content. The system can identify a plurality of names within the media content metadata and remove a plurality of stop words from the media content metadata. The system can determine a plurality of unigrams and a plurality of bigrams from the media content metadata. The system can determine a plurality of misspellings of the media content metadata. The system can compile the plurality of names, the plurality of stop words, the plurality of unigrams, the plurality of bigrams, and the plurality of misspellings as results. The system can determine a plurality of incorrect search strings based upon the results and can create a dictionary including the plurality of incorrect search strings mapped to a plurality of correct search strings.

15 Claims, 8 Drawing Sheets

(56) References Cited

U.S. PATENT DOCUMENTS

| | | | |
|---|---|---|---|
| 2019/0370393 A1* | 12/2019 | Finch | G06F 16/3338 |
| 2020/0019564 A1* | 1/2020 | Des Jardins | G10L 15/063 |
| 2020/0356626 A1* | 11/2020 | Cogley | G06F 40/242 |
| 2021/0326526 A1* | 10/2021 | Yee | G16H 10/20 |
| 2022/0269706 A1* | 8/2022 | Balasubramanian | G06F 16/335 |

* cited by examiner

INCREASING MISSPELLING, TYPOGRAPHICAL, AND PARTIAL SEARCH TOLERANCE FOR SEARCH TERMS

BACKGROUND

Semantic search is used by search engines to consider the intent and contextual meaning of search phrases when serving content to users on the web. In the past, search engines could only analyze the exact phrasing of a search term when matching results with a search query. More recently, search algorithms have become more sophisticated and incorporate semantic search principles when ranking content.

For semantic search to work, the search string should be correctly spelled. This is generally addressed by a spell checker or a type ahead feature. However, in absence of these features or where domain specific search terms are relatively uncommon words, such as, for example, industry specific terms, non-common names, data and feature names, short form names, and the like, sematic search will fail.

SUMMARY

Concepts and technologies disclosed herein are directed to increasing misspelling, typographical, and partial search tolerance for search terms. According to one aspect disclosed herein, a media search module executed by a processor of a system can obtain media content metadata associated with media content. The media content metadata can include a plurality of titles for the media content. The media content can include downloadable and/or streamable media content, including, for example, movies, television shows, music, and the like. In some embodiments, the media search module is executed by the processor of a media playback device. In other embodiments, the media search module is executed by the processor of a data center that hosts a media service. The media search module can be located elsewhere such as part of a standalone search service. The media search module can identify a plurality of names within the media content metadata. The media search module can remove a plurality of stop words from the media content metadata. The media search module can determine a plurality of unigrams and a plurality of bigrams from the media content metadata. The media search module can determine a plurality of misspellings of the media content metadata. The plurality of misspelling can encompass clear misspellings, other typographical errors, and/or partial search terms. The media search module can compile the plurality of names, the plurality of stop words, the plurality of unigrams, the plurality of bigrams, and the plurality of misspellings as results. The media search module can determine a plurality of incorrect search strings based upon the results. The media search module can create a dictionary including the plurality of incorrect search strings mapped to a plurality of correct search strings associated with the media content metadata. In some embodiments, the media search module can create the dictionary based upon at least one rule that limits a number of the plurality of incorrect search strings for the media content.

The media search module can provide a search user interface. The media search module can receive, via the search user interface, a search string input by a user. The media search module can determine whether the search string is in the plurality of incorrect search strings. In response to determining that the search string is in the plurality of incorrect search strings, the media search module can determine, for the search string, a correct search string associated with an incorrect search string within the dictionary. The media search module can then submit a search using the correct search string. The search can be performed locally by the system or submitted to a remote system operating as part of a media service and/or a media source. In either case, the media search module can receive search results and can present the search results to the user. In this manner, the user can receive useful search results instead of a null result as is the case in many non-standard searches such as media searches.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
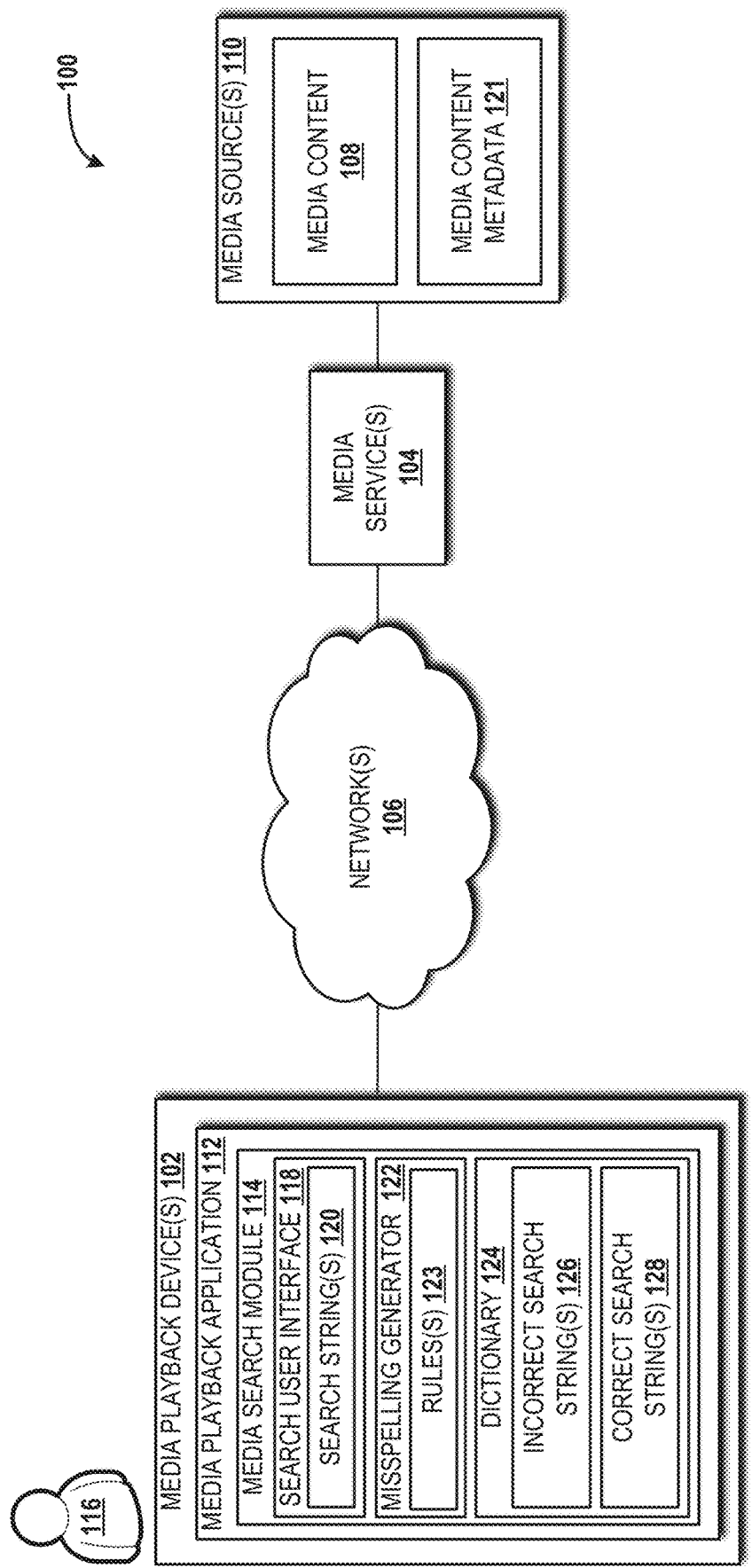
FIG. 1 is a block diagram illustrating aspects of an illustrative operating environment in which the concept and technologies disclosed herein can be implemented.

The concepts and technologies disclosed herein provide an innovative way to increase misspelling, typographical, and partial search tolerance for search strings to reduce "no results found" returns. The concepts and technologies disclosed herein are particularly useful in searches for proper nouns as well as domain specific search strings. In cases where type-ahead features are not available for search inputs, the concepts and technologies disclosed herein provide a solution to mitigate some of the null search returns. The concepts and technologies disclosed herein may find particular application to support search functionality on video and other media over-the-top platforms. However, the concepts and technologies disclosed herein may find application in other implementations where the search terms are domain specific or utilize proper nouns, such as, for example, in a dataset search, feature search, medical terminology search, industry-specific search, processing text for intent modeling or classification, and the like.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for increasing misspelling, typographical, and partial search tolerance for search terms will be described.

Referring now to FIG. 1, an illustrative operating environment 100 in which the concepts and technologies disclosed herein can be implemented will be described. The operating environment 100 is illustrated and described in context of media search and playback. Those skilled in the art will appreciate that the concepts and technologies disclosed herein are applicable to other types of searches such as, but not limited to, searches that are domain specific or that utilize proper nouns, such as, for example, in a dataset search, feature search, medical terminology search, industry-specific search, processing text for intent modeling or classification, and the like. Accordingly, the context in which the operating environment 100 is described should not be construed as being limiting in any way.

The operating environment 100 includes one or more media playback devices 102 (hereafter referred to individually as "media playback device 102" or collectively as "media playback devices 102") operating in communication with one or more media services 104 (hereafter referred to individually as "media service 104" or collectively as "media services 104") via one or more networks 106 (hereafter referred to individually as "network 106" or collectively as "networks 106") to obtain media content 108 from one or more media sources 110 for playback by the media playback device(s) 102 via a media playback application 112.

The media playback devices 102 can generally include any system or device that can play back the media content 108. The media content 108 can be or can include, but is not limited to, music, movies, television shows, or some combination thereof. As such, the media playback devices 102 can be or can include one or more video output components such as display(s) and/or video output interfaces (e.g., High-Definition Multimedia Interface "HDMI," Display-Port, and/or the like) and one or more audio output components such as speaker(s), headphone jack(s), and/or audio output interfaces (e.g., optical audio output, HDMI, and/or the like). More specifically, the media playback devices 102 can be smartphones, tablets, personal computers, smart televisions, smart displays, smart home devices, smart speaker devices, vehicle infotainment devices, medical devices, physical media playback devices (e.g., Blu-ray player), set-top boxes, audio/video streaming devices, video game systems, over-the-top media playback devices, Internet of Things ("IoT") devices, proprietary devices, specialty devices, and the like.

The media services 104 can include media download services, media streaming services, or a combination thereof. A media service 104 can provide access to one or more of the media sources 110. The media services 104 can be provided as part of a subscription, one-time use, or for a specified time period. The media services 104 can be free or may have an associated cost. The media services 104 can be bundled with other services (not shown) such as cellular telecommunications service, Internet access service, cable/satellite or other television service, and/or the like. The media services 104 can be hosted locally (e.g., a home media server) to the media playback device(s) 102 or remotely (e.g., a cloud-based data center) from the media playback device(s) 102.

The media source(s) 110 can be hosted by or for the media services 104. The media source(s) 110 can be hosted locally, such as on a home media server, accessible via a LAN to which the media playback device 102 can be connected. The media source(s) 110 can be hosted remotely, such as at a cloud-based data center, accessible via the Internet to which the media playback device 102 can be connected.

The network(s) 106 can be or can include one or more wireless and/or wired local area networks ("LANs"), one or more wireless or wired wide area networks ("WANs") (e.g., a wireless WAN provided by a mobile service provider), one or more packet data networks ("PDNs") (e.g., the Internet), combinations thereof, and/or the like. Additional details about the network(s) 106 will be described herein with reference to FIG. 6.

The media playback application 112 can include a media search module 114 through which a user 116 can interact with a search user interface 118 to search the media service(s) 104 for specific media content 108 using one or more search strings 120. The media search module 114 can obtain (e.g., periodically such as once per day) media content metadata 121 associated with the media content 108. The media content metadata 121 can include descriptive information about the media content 108 such as, for example, title(s), director(s), producer(s), actor(s), genre(s), artist(s), composer(s), and the like. A misspelling generator 122 can utilize the media content metadata 121 and one or more rules 123 to identify what are probable incorrect search strings 126 that the user 116 may enter into the search user interface 118 to search the media content 108 for a particular piece of the media content 108. The probable incorrect search strings 126 can encompass clear misspellings, other typographical errors, and/or partial search terms. The misspelling generator 122 can also create a dictionary 124 of the incorrect search strings 126 mapped to correct search strings 128. In this manner, the user 116 can enter a misspelled search string (e.g., a misspelled title of a movie) that will return useful search results rather than a "no results found" or similar return.

The functionality of the media search module 114 is described as being native to the media playback device(s)

102. Alternatively, the functionality of the media search module 114 can be provided by the media service(s) 104. The functionality of the media search module 114 may be provided elsewhere such as via a dedicated search platform that is separate from the media playback device(s) 102 and the media service(s) 104. Accordingly, the illustrated embodiment of the operating environment 100 should not be construed as being limiting in any way.

In some embodiments, the misspelling generator 122 can provide an output that includes a list of probable unigrams, partial words or phrases, and misspellings for the media content 108. The media content 108 may be divided into media content sets (not shown), such as, for example, a set of top shows and movie titles for one or more popular video streaming services (e.g., part of the media service(s) 104). As such, the list can be associated with the entirety of the media content 108 or a subset thereof, the latter of which is less computationally-intensive and more likely to provide more accurate results. The list can be derived directly from the media service(s) 104 and/or other sources such as review sites, wikis, and the like. The list can be provided as part of the incorrect search string(s) 126 and can map to the correct search string(s) 128 and therefore the correct media content 108 within the dictionary 124.

Examples of probable incorrect search string(s) 126 will now be described. The user 116 may enter a search string 120 for "Sheldon" instead of "Young Sheldon" or "Harry Potter" instead of "Harry Potter and the Sorcerer's Stone" expecting adequate search results. Since the media content metadata 121 does not include exactly "Sheldon" or "Harry Potter" without other words— that is "Young" and "and the Sorcerer's Stone"—a typical media search may return a null result or irrelevant results that contain the word "Young" or "Stone." As such, titles that have names can be identified as having probable incorrect search strings 126 associated therewith. The user 116 alternatively may enter a search string 120 for "Big Bang Theory" instead of "The Big Bang Theory" or "Sopranos" instead of "The Sopranos." The word "The" in both of these examples is a common stop word. Stop words are a set of commonly used words in a given language. Stop words are so commonly used that they carry little to no useful information, which is the reason many users may choose to avoid their usage in the search strings 120. Other stop words include "a," "is," "are," and the like. As such, titles that have stop words can be identified as having probable incorrect search strings 126 associated therewith. Unigrams and bigrams are another example. A unigram is a one-word sequence of words, whereas a bigram is a two-word sequence of words. In the above example, "The Big Bang Theory" may be truncated by the user 116 to the bigram "Big Bang," as may be colloquially known by fans of the television show. Similarly, the show "Lovecraft Country" may be shortened to the unigram "Lovecraft." Partial search strings also can be considered. For example, a partial search string of "Sheld" for "Young Sheldon" or "Euph" for "Euphoria" may be entered by the user 116 expecting a type ahead feature that auto-completes the search string 120 entered by the user 116. Misspellings can also be considered. For QWERTY-based input (physical or virtual keys) that is commonplace on personal computers, tablets, and smartphones, the misspelling generator 122 can force the first letter to be correct and allow for a maximum edit distance (e.g., two characters).

The rule(s) 123 used by the misspelling generator 122 can ensure that the aforementioned probable incorrect search strings 126 are determined. These rules can be modified for a given implementation, and as such, the example rules 123 described below should not be construed as being limiting in any way. One of the rules 123 can define QWERTY adjacency such as to allow only keys that are adjacent to the correct letter on a keyboard. For example, the user 116 may enter "S" instead of "A" or "D." Additionally, one of the rules 123 can specify a max edit distance (e.g., two characters in the above example). Other rules 123 can account for inserted keys, skipped letters, double letters, reverse letters, wrong vowels, wrong keys, some combination thereof, and/or the like.

The misspelling generator 122 can create a list of incorrect search string(s) 126 for each piece of media content 108 or a subset of the media content 108 (e.g., top 50 movies and television shows). In some embodiments, the misspelling generator 122 implements a machine learning model. The machine learning model can be a proprietary model or an open source model. An example open source model is FastText (available from FACEBOOK INC.). In some embodiments, the list of incorrect search string(s) 126 for each title may be limited to a maximum number of incorrect search string(s) 126. The maximum number may be applied across all titles or individually for each title.

FastText is described herein as an example machine learning model capable of creating the list of incorrect search string(s) 126 described above. Additional contextual details about FastText will now be described. Briefly, FastText is a way to obtain dense vector space representations for words. FastText modifies the Skip-gram algorithm from word2vec (algorithm described in U.S. Pat. No. 9,037,464 assigned to GOOGLE LLC) by including character level sub-word information. For example, the word "hello" within min_n=3 and max_n=4 can be broken down into ["##h," "#he," "hel," "ell," "llo," "lo #," "o ##," "###h," "##he," "#hel," "hell," "ello," "llo #," "lo ##," "o ###,"]. FastText uses a hashing technique to bucket all of the same sub-word level tokens and assigns a single vector to each. The vector for the full word is the sum of all sub-level vectors. In context of the concepts and technologies disclosed herein, words that have the same sub-word level information within them will be closer to each other.

Figure 2:
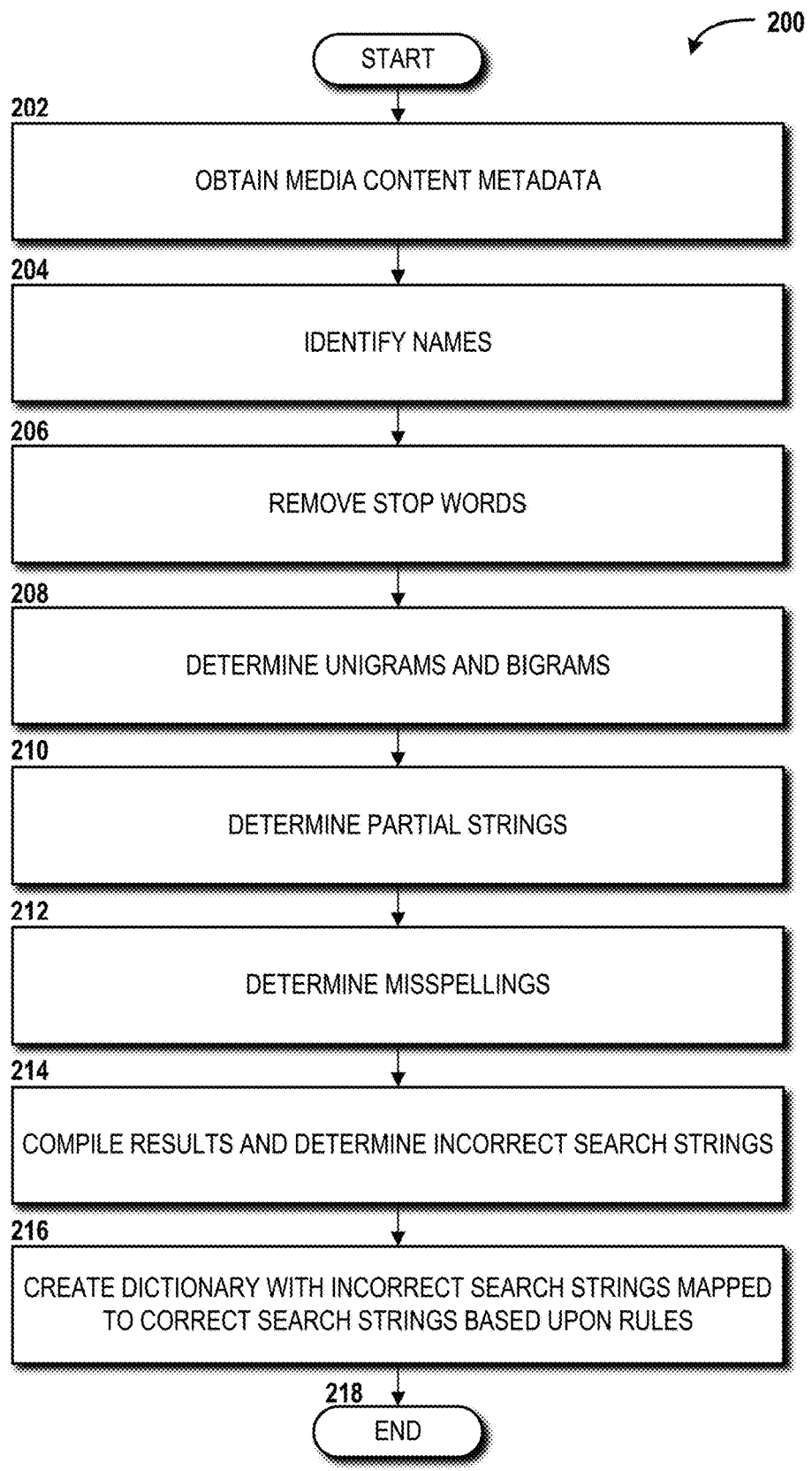
FIG. 2 is a flow diagram illustrating a method for creating a dictionary of incorrect search strings mapped to correct search strings to provide increased misspelling tolerance, according to an illustrative embodiment.

Turning now to FIG. 2, a flow diagram illustrating a method 200 for creating a dictionary 124 of incorrect search strings 126 mapped to correct search strings 128 to provide increased misspelling tolerance for non-standard searches (e.g., media search) will be described, according to an illustrative embodiment. The method 200 will be described with reference to FIG. 2 and additional reference to FIG. 1. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, operations of the methods disclosed herein may be described as being performed, at least in part, by the media search module 114 that can be executed, at least in part, by the media playback device 102, media service 104, the media source 110, and/or other network elements, systems, and/or devices associated therewith and/or otherwise disclosed herein, via execution, by one or more processors. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described from the perspective of a media playback device 102 executing a media playback application 112 (e.g., a video streaming application such as HBO MAX available from WarnerMedia Direct, LLC.) that includes a media search module 114 as described herein above. Alternatively, the functionality of the media search module 114 can be elsewhere such as part of the media service(s) 104, the media source(s) 110, a standalone search provider, or other systems, devices, and/or platforms. As such, the method 200 as described should not be construed as being limited to the embodiment illustrated in FIG. 1, wherein the media search module 114 is executed by the media playback device 102.

The method 200 begins and proceeds to operation 202. At operation 202, the media search module 114 obtains the media content metadata 121 associated with at least a portion of the media content 108. The media search module 114 can be programmed to obtain the media content metadata 121 at some periodic interval such as daily or nightly. The media content metadata 121 can be obtained from the media sources 110 as shown in FIG. 1 and/or other sources (not shown in FIG. 1) such as review websites and wikis. For purposes of the method 200, the media content metadata 121 includes a title of each piece of the media content 108. The portion can be a subset of the media content 108 such as the top 50 movies and television shows available from the media service(s) 104 or a particular media service 104.

From operation 202, the method 200 proceeds to operation 204. At operation 204, the media search module 114 identifies names within the media content metadata 121. A name can be of a person (e.g., a character in a movie such as "Harry Potter"), a place (e.g., a location in a movie such as "Azkaban"), or a thing (e.g., a thing in a movie such as "Goblet of Fire"). In some embodiments, the media search module 114 can implement named-entity recognition ("NER") to label sequences of words in a text (e.g., a movie title) that are names.

From operation 204, the method 200 proceeds to operation 206. At operation 206, the media search module 114 removes any stop words from the media content metadata 121. Stop words are a set of commonly used words in a given language. Stop words are so commonly used that they carry little to no useful information, such as "a," "is," "are," and the like.

From operation 206, the method 200 proceeds to operation 208. At operation 208, the media search module 114 determines any unigrams and bigrams within the media content metadata 121. For example, a bigram for the show "The Big Bang Theory" could be "Big Bang." Similarly, the unigram for the show "Lovecraft Country" could be "Lovecraft." The media search module 114 can use constraints to determine whether the unigram or bigram should be used for a given title. For example, if the number of words in the title is less than or equal to 3, then the media search module 114 can determine to use the unigram. Moreover, if the number of words in the title is greater than 3, then the media search module 114 can determine to use the bigram. Other constraints can be used and may change based upon the needs of a given implementation.

From operation 208, the method 200 proceeds to operation 210. At operation 210, the media search module 114 determines any partial search strings. For example, a partial search string of "Sheld" for "Young Sheldon" or "Euph" for "Euphoria." The media search module 114 can utilize constraints based upon the number of characters in a given unigram or bigram (e.g., the unigram(s) and/or bigram(s) determined at operation 208). For example, if a unigram or a first term of a bigram has a length greater than 4 characters and less than or equal to 8 characters, a percentage of 60% of the characters are required. For lengths greater than 8 characters, a percentage of 50% of the characters are required.

From operation 210, the method 200 proceeds to operation 212. At operation 212, the media search module 114 determines any misspellings. For example, misspellings can be common for input that is QWERTY-based (or other keyboard layout) and may have a max edit distance (e.g., two characters).

From operation 212, the method 200 proceeds to operation 214. At operation 214, the media search module 114 compiles the results from operations 204, 206, 208, 210, and 212 and determines a list of the incorrect search strings 126 for the media content 108 for which the media content metadata 121 was obtained at operation 202.

From operation 214, the method 200 proceeds to operation 216. At operation 216, the media search module 114 creates the dictionary 124 that includes the list of the incorrect search strings 126 mapped to the correct search strings 128 based upon the rule(s) 123.

From operation 216, the method 200 proceeds to operation 218. The method 200 can end at operation 218.

Figure 3:
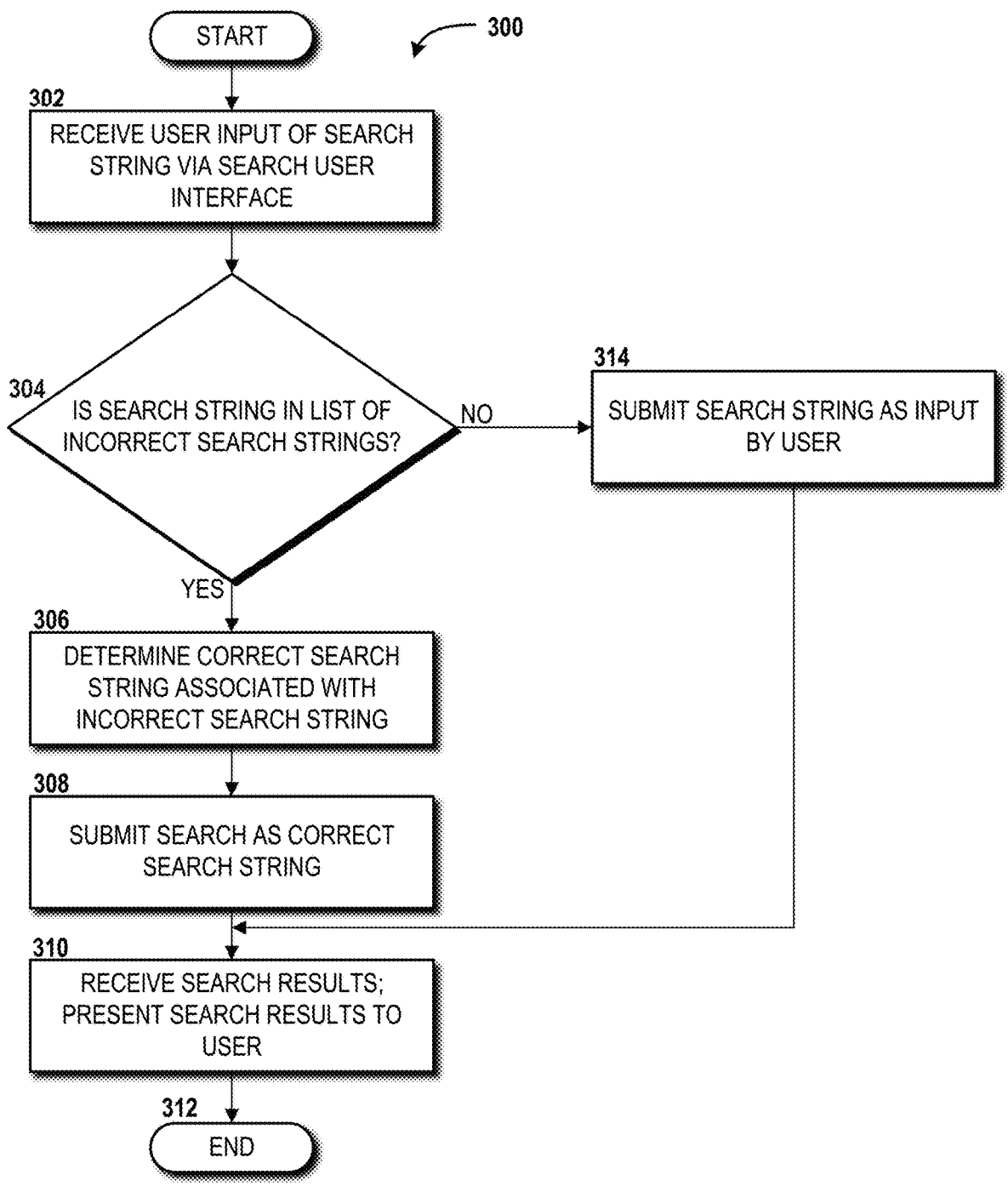
FIG. 3 is a flow diagram illustrating a method for performing a non-standard search such as a media search, according to an illustrative embodiment.

Turning now to FIG. 3, a flow diagram illustrating a method 300 for performing a non-standard search such as a media search will be described, according to an illustrative embodiment. The method 300 will be described from the perspective of a media playback device 102 executing a media playback application 112 (e.g., a video streaming application such as HBO MAX available from WarnerMedia Direct, LLC.) that includes a media search module 114 as described herein above. Alternatively, the functionality of the media search module 114 can be elsewhere such as part of the media service(s) 104, the media source(s) 110, a standalone search provider, or other systems, devices, and/or platforms. As such, the method 300 as described should not be construed as being limited to the embodiment illustrated in FIG. 1, wherein the media search module 114 is executed by the media playback device 102.

The method 300 begins and proceeds to operation 302. At operation 302, the media search module 114 receives, via the search user interface 118, user input of a search string 120. The search string 120 can contain any number of characters in any number of words. It should be noted that the number of total characters, the number of total words, and/or the number of characters per word can be subject to constraint based upon the needs of a given implementation. The search user interface 118 can include, among other things, a text box in which the user 116 can type one or more characters. Other methods of input such as voice-based input (i.e., voice to text) are contemplated.

From operation 302, the method 300 proceeds to operation 304. At operation 304, the media search module 114 determines whether the search string 120 input at operation 302 is in the list of the incorrect search strings 126 created at operation 216 of the method 200 described above with reference to FIG. 2. If the media search module 114 determines that the search string 120 is in the list of the incorrect search strings 126, the method 300 proceeds to operation 306.

At operation 306, the media search module 114 determines the correct search string 128 associated with the incorrect search string 126 that corresponds to the search string 120. From operation 306, the method 300 proceeds to operation 308. At operation 308, the media search module 114 submits to the media service(s) 104 a search as the correct search string 128. From operation 308, the method 300 proceeds to operation 310. At operation 310, the media search module 114 receives search results and presents the search results to the user 116. From operation 310, the method 300 proceeds to operation 312. The method 300 can end at operation 312.

Returning to operation 304, if the media search module 114 determines that the search string 120 is not in the list of the incorrect search strings 126, the method 300 proceeds to operation 314. At operation 314, the media search module 114 submits the search string 120 as input by the user 116. From operation 314, the method 300 proceeds to operation 310. At operation 310, the media search module 114 receives search results and presents the search results to the user 116. From operation 310, the method 300 proceeds to operation 312. The method 300 can end at operation 312.

Figure 4:
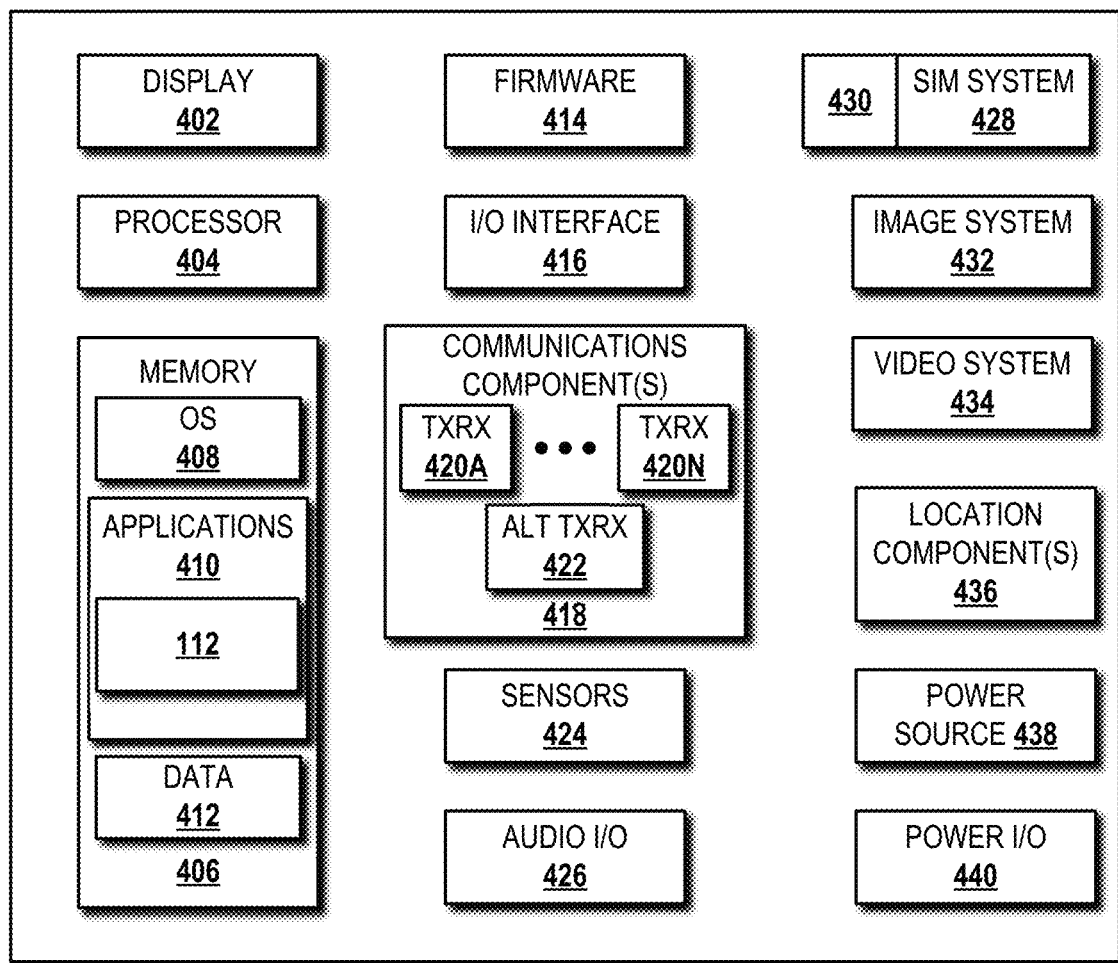
FIG. 4 is a block diagram illustrating an example mobile device, according to an illustrative embodiment.

Turning now to FIG. 4, an illustrative mobile device 400 and components thereof will be described. In some embodiments, the media playback device 102 described above with reference to FIG. 1 can be configured as and/or can have an architecture similar or identical to the mobile device 400 described herein in FIG. 4. It should be understood, however, that media playback device 102 may or may not include the functionality described herein with reference to FIG. 4. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display the search user interface 118, search results, network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, such as the media playback application 112 (including the media search module 114), other computer-executable instructions stored in the memory 406, or the like.

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in data communications, entering/deleting data, entering and setting user IDs and passwords for device access, configuring settings, manipulating content and/or settings, multimode interaction, interacting with other applications 410, and otherwise facilitating user interaction with the operating system 408, the applications 410, and/or other types or instances of data 412 that can be stored at the mobile device 400.

The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1395 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments, one or more of the transceivers of the communications component 418 may be configured to communicate using GSM, CDMAONE, CDMA2000, UMTS, LTE, and various other 2G, 3G, 4G, 5G, 6G, and greater generation technology standards. Moreover, the communications component 418 may facilitate communications over various channel access methods (which may or may not be used by the aforementioned standards) including, but not limited to, TDMA, FDMA, W-CDMA, OFDM, SDMA, and the like.

In addition, the communications component 418 may facilitate data communications using GPRS, EDGE, the HSPA protocol family including HSDPA, EUL or otherwise termed HSUPA, HSPA+, and various other current and future wireless data access standards. In the illustrated embodiment, the communications component 418 can include a first transceiver ("TxRx") 420A that can operate in a first communications mode (e.g., GSM). The communications component 418 also can include an Nth transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted-GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 500 described below with reference to FIG. 5. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Figure 5:
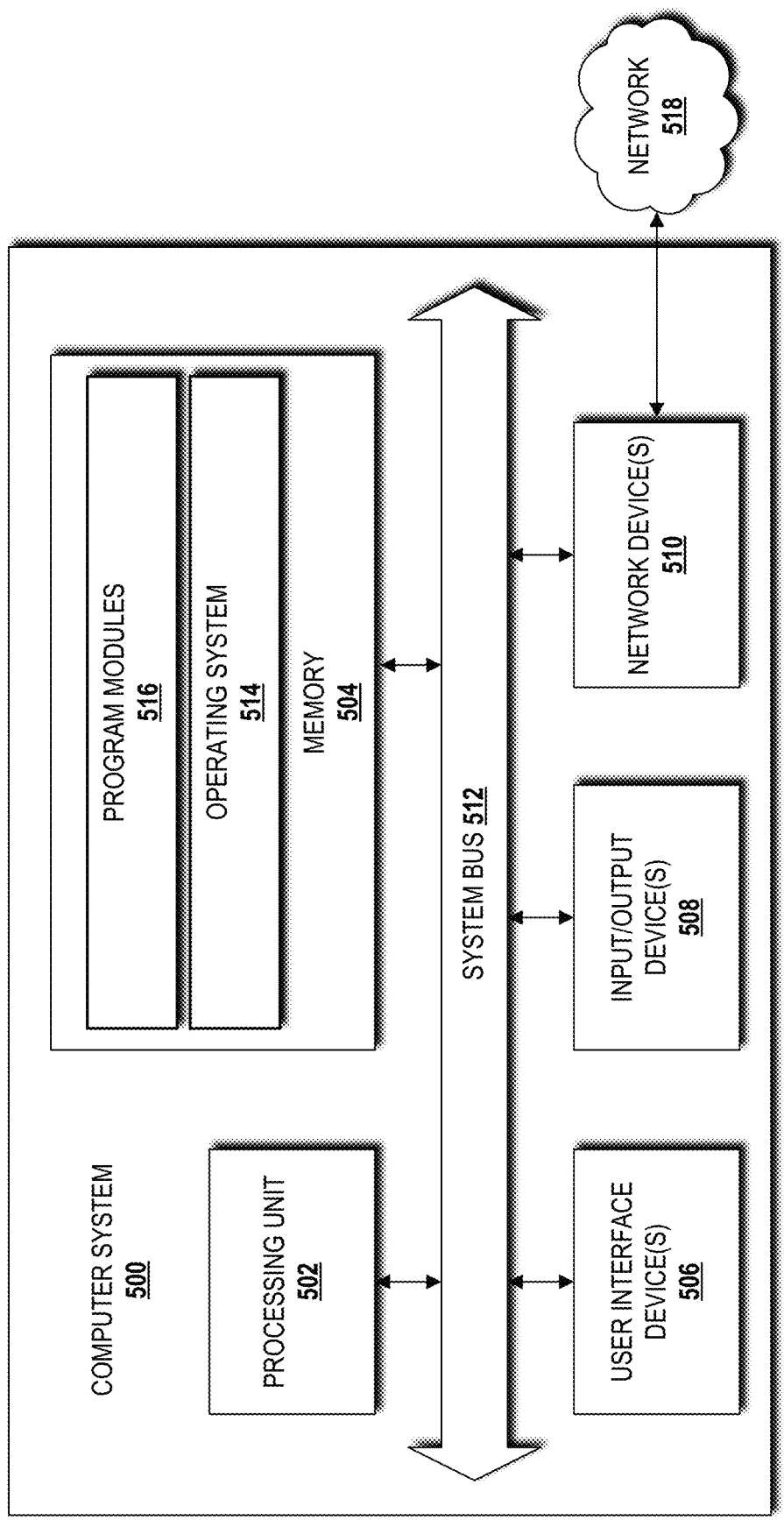
FIG. 5 is a block diagram illustrating an example computer system capable of implementing aspects of the embodiments presented herein.

Turning now to FIG. 5 is a block diagram illustrating a computer system 500 configured to provide the functionality in accordance with various embodiments of the concepts and technologies disclosed herein. The systems, devices, and other components disclosed herein, such as the media playback device 102, can be implemented, at least in part, using an architecture that is the same as or similar to the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein such as the media playback application 112 and the media search module 114. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium," "computer-readable storage medium," and variations thereof does not include waves or signals per se and/or communication media, and therefore should be construed as being directed to "non-transitory" media only.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518, such as the network(s) 106. Examples of the network devices 510 include, but are not limited to, a modem, a radio frequency ("RF") or infrared ("IR") transceiver, a telephonic interface, a bridge, a router, or a network card. The network 518 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be or may include a wired network such as, but not limited to, a Wide Area Network ("WAN"), a wired Personal Area Network ("PAN"), or a wired Metropolitan Area Network ("MAN").

Figure 6:
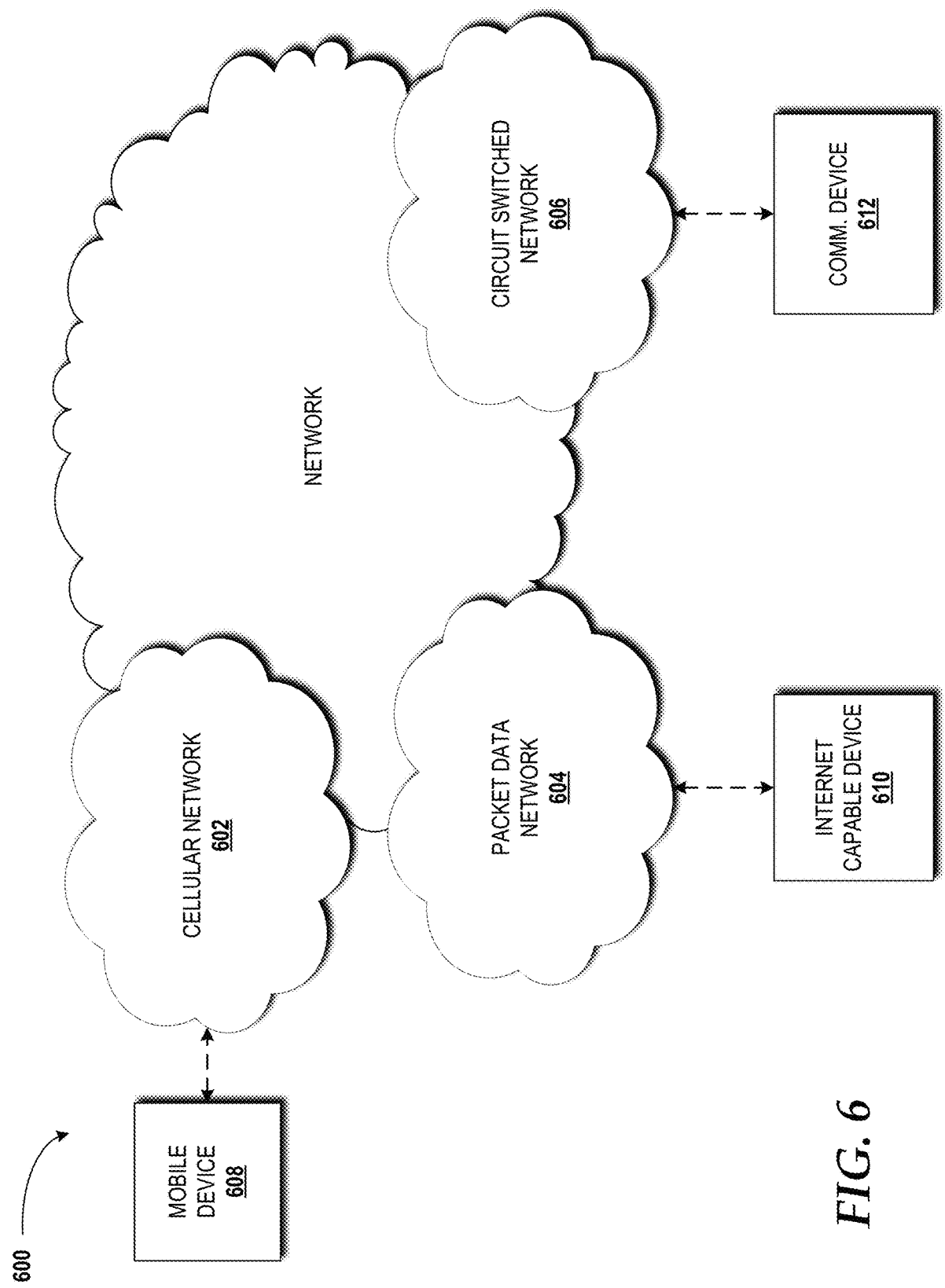
FIG. 6 is a diagram illustrating a network, according to an illustrative embodiment.

Turning now to FIG. 6, details of a network 600 are illustrated, according to an illustrative embodiment. In some embodiments, the network 600 can include the network(s) 106. The network 600 includes a cellular network 602, a packet data network 604, for example, the Internet, and a circuit switched network 606, for example, a public switched telephone network ("PSTN"). The cellular network 602 includes various components such as, but not limited to, base transceiver stations ("BTSs"), NBs or eNBs, combination eNB/gNB, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the media playback device 102, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, the media playback device(s) 102 a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network is used to refer broadly to any combination of the networks 602, 604, 606 shown in FIG. 6. It should be appreciated that substantially all of the functionality described with reference to the network(s) 106 can be performed by the cellular network 602, the packet data network 604, and/or the circuit switched network 606, alone or in combination with other networks, network elements, and the like.

Figure 7:
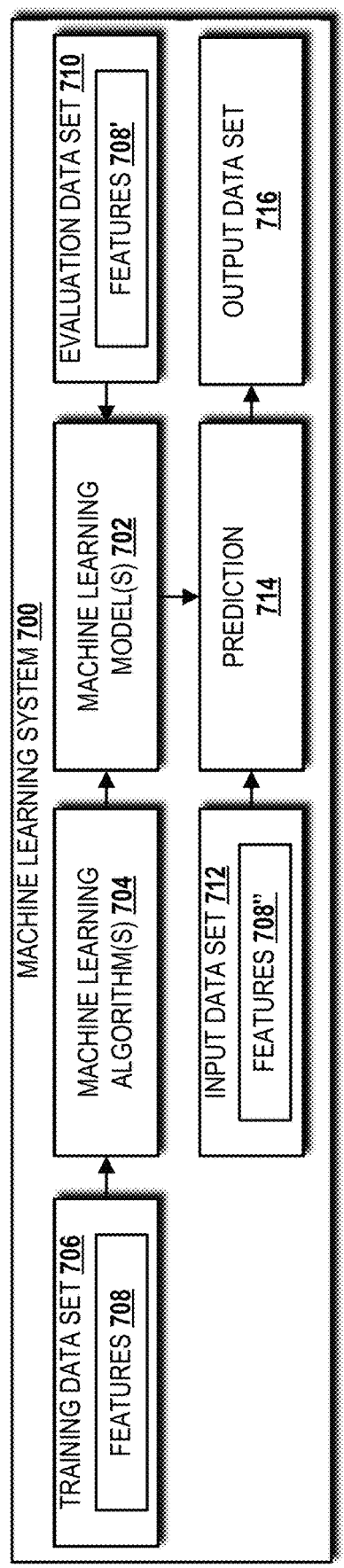
FIG. 7 is a block diagram illustrating a machine learning system capable of implementing aspects of the concepts and technologies disclosed herein.

Turning now to FIG. 7, a machine learning system 700 capable of implementing aspects of the embodiments disclosed herein will be described. In some embodiments, the misspelling generator 122 and the media search module 114 can implement or otherwise utilize a machine learning system such as the machine learning system 700. The illustrated machine learning system 700 includes one or more machine learning models 702 (e.g., FastText). The machine learning models 702 can include supervised and/or semi-supervised learning models. The machine learning model(s) 702 can be created by the machine learning system 700 based upon one or more machine learning algorithms 704. The machine learning algorithm(s) 704 can be any existing, well-known algorithm, any proprietary algorithms, or any future machine learning algorithm. Some example machine learning algorithms 704 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 704 based upon the problem(s) to be solved by machine learning via the machine learning system 700.

The machine learning system 700 can control the creation of the machine learning models 702 via one or more training parameters. In some embodiments, the training parameters are selected modelers at the direction of an enterprise, for example. Alternatively, in some embodiments, the training parameters are automatically selected based upon data provided in one or more training data sets 706, such using correct unigram and bigrams and generated misspellings. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 704 converges to the optimal weights. The machine learning algorithm 704 can update the weights for every data example included in the training data set 706. The size of an update is controlled by the learning rate. A learning rate that is too high might prevent the machine learning algorithm 704 from converging to the optimal weights. A learning rate that is too low might result in the machine learning algorithm 704 requiring multiple training passes to converge to the optimal weights.

The model size is regulated by the number of input features ("features") 708 in the training data set 706. A greater the number of features 708 yields a greater number of possible patterns that can be determined from the training data set 706. The model size should be selected to balance the resources (e.g., compute, memory, storage, etc.) needed for training and the predictive power of the resultant machine learning model 702.

The number of training passes indicates the number of training passes that the machine learning algorithm 704 makes over the training data set 706 during the training process. The number of training passes can be adjusted based, for example, on the size of the training data set 706, with larger training data sets being exposed to fewer training passes in consideration of time and/or resource utilization. The effectiveness of the resultant machine learning model 702 can be increased by multiple training passes.

Data shuffling is a training parameter designed to prevent the machine learning algorithm 704 from reaching false optimal weights due to the order in which data contained in the training data set 706 is processed. For example, data provided in rows and columns might be analyzed first row, second row, third row, etc., and thus an optimal weight might be obtained well before a full range of data has been considered. By data shuffling, the data contained in the training data set 706 can be analyzed more thoroughly and mitigate bias in the resultant machine learning model 702.

Regularization is a training parameter that helps to prevent the machine learning model 702 from memorizing training data from the training data set 706. In other words, the machine learning model 702 fits the training data set 706, but the predictive performance of the machine learning model 702 is not acceptable. Regularization helps the machine learning system 700 avoid this overfitting/memorization problem by adjusting extreme weight values of the features 708. For example, a feature that has a small weight value relative to the weight values of the other features in the training data set 706 can be adjusted to zero.

The machine learning system 700 can determine model accuracy after training by using one or more evaluation data sets 710 containing the same features 708' as the features 708 in the training data set 706. This also prevents the machine learning model 702 from simply memorizing the data contained in the training data set 706. The number of evaluation passes made by the machine learning system 700 can be regulated by a target model accuracy that, when reached, ends the evaluation process and the machine learning model 702 is considered ready for deployment.

After deployment, the machine learning model 702 can perform a prediction operation ("prediction") 714 with an input data set 712 having the same features 708" as the features 708 in the training data set 706 and the features 708' of the evaluation data set 710. The results of the prediction 714 are included in an output data set 716 consisting of predicted data. The machine learning model 702 can perform other operations, such as regression, classification, and others. As such, the example illustrated in FIG. 7 should not be construed as being limiting in any way.

Figure 8:
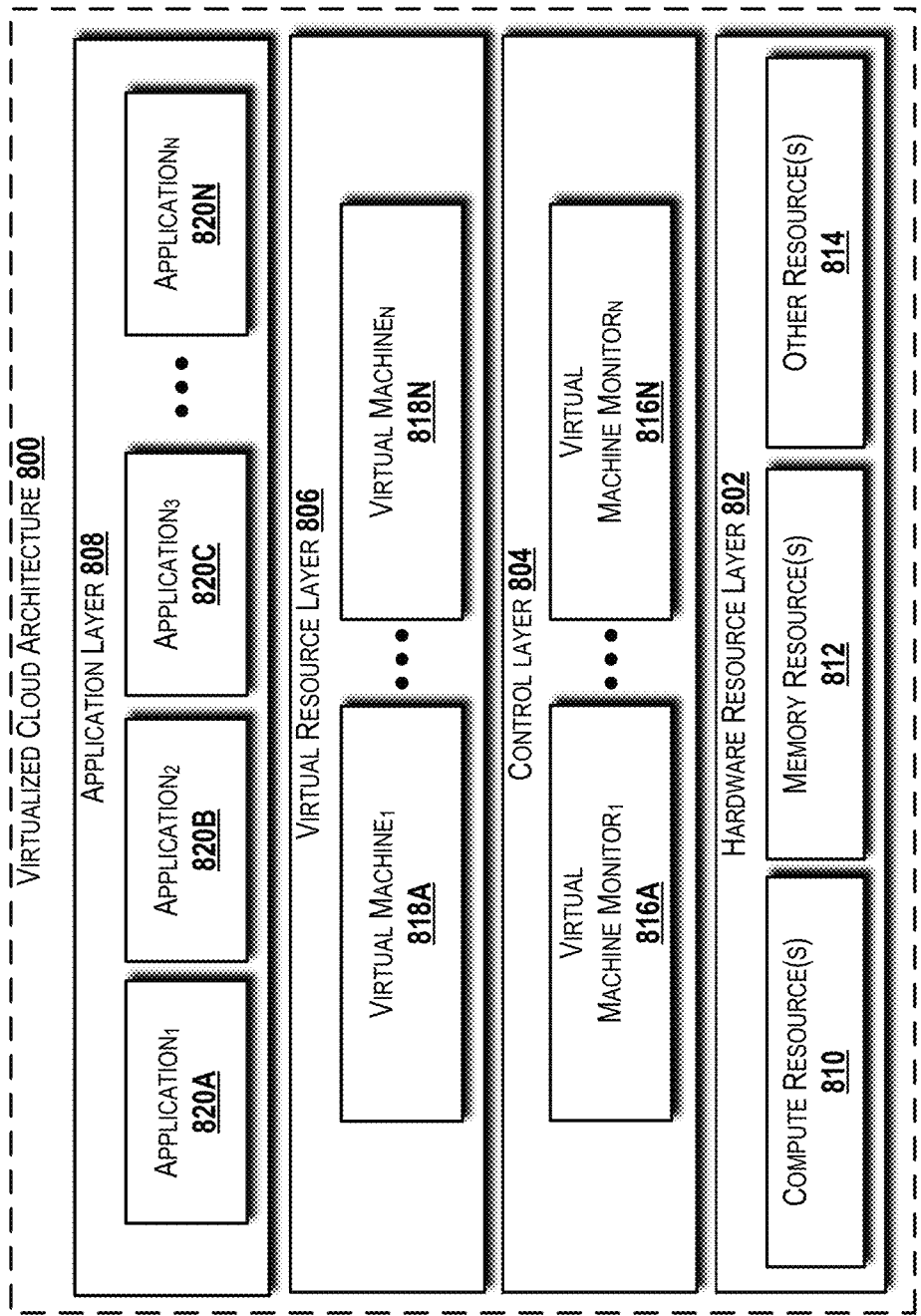
FIG. 8 is a block diagram illustrating a virtualized cloud architecture capable of implementing aspects of the concepts and technologies disclosed herein.

Turning now to FIG. 8, a block diagram illustrating an example virtualized cloud architecture 800 and components thereof will be described, according to an exemplary embodiment. In some embodiments, the virtualized cloud architecture 800 can be utilized to implement, at least in part, the media services 104, the media source(s) 110, or portions thereof. The virtualized cloud architecture 800 is a shared infrastructure that can support multiple services and network applications. The illustrated virtualized cloud architecture 800 includes a hardware resource layer 802, a control layer 804, a virtual resource layer 806, and an application layer 808 that work together to perform operations as will be described in detail herein.

The hardware resource layer 802 provides hardware resources, which, in the illustrated embodiment, include one or more compute resources 810, one or more memory resources 812, and one or more other resources 814. The compute resource(s) 810 can include one or more hardware components that perform computations to process data, and/or to execute computer-executable instructions of one or more application programs, operating systems, and/or other software. The compute resources 810 can include one or more central processing units ("CPUs") configured with one or more processing cores. The compute resources 810 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 810 can include one or more discrete GPUs. In some other embodiments, the compute resources 810 can include CPU and GPU components that are configured in accordance with a co-processing CPU/GPU computing model, wherein the sequential part of an application executes on the CPU and the computationally-intensive part is accelerated by the GPU. The compute resources 810 can include one or more system-on-chip ("SoC") components along with one or more other components, including, for example, one or more of the memory resources 812, and/or one or more of the other resources 814. In some embodiments, the compute resources 810 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 810 can be or can include one or more hardware components architected in accordance with an advanced reduced instruction set computing ("RISC") machine ("ARM") architecture, available for license from ARM HOLDINGS. Alternatively, the compute resources 810 can be or can include one or more hardware components architected in accordance with an x86 architecture, such an architecture available from INTEL CORPORATION of Mountain View, California, and others. Those skilled in the art will appreciate the implementation of the compute resources 810 can utilize various computation architectures, and as such, the compute resources 810 should not be construed as being limited to any particular computation architecture or combination of computation architectures, including those explicitly disclosed herein.

The memory resource(s) 812 can include one or more hardware components that perform storage operations, including temporary or permanent storage operations. In some embodiments, the memory resource(s) 812 include volatile and/or non-volatile memory implemented in any method or technology for storage of information such as computer-readable instructions, data structures, program modules, or other data disclosed herein.

Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 810.

The other resource(s) 814 can include any other hardware resources that can be utilized by the compute resources(s) 810 and/or the memory resource(s) 812 to perform operations described herein. The other resource(s) 814 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 802 can be virtualized by one or more virtual machine monitors ("VMMs") 816A-816N (also known as "hypervisors;" hereinafter "VMMs 816") operating within the control layer 804 to manage one or more virtual resources that reside in the virtual resource layer 806. The VMMs 816 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 810, the memory resources 812, the other resources 814, or any combination thereof. These abstractions are referred to herein as virtual machines ("VMs"). In the illustrated embodiment, the virtual resource layer 806 includes VMs 818A-818N (hereinafter "VMs 818"). Each of the VMs 818 can execute one or more applications 820A-820N in the application layer 808.

Based on the foregoing, it should be appreciated that concepts and technologies directed to increasing misspelling, typographical, and partial search tolerance for search terms have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
obtaining, by a media search module executed by a processor of a media playback device, media content metadata associated with a plurality of pieces of media content available for playback by the media playback device, wherein the media content metadata comprises a corresponding title of each of the plurality of pieces of media content;
identifying, by the media search module, a plurality of names within the media content metadata;
removing, by the media search module, a plurality of stop words from the media content metadata;
determining, by the media search module, a plurality of unigrams and a plurality of bigrams from the media content metadata;
determining, by the media search module, a plurality of misspellings of the media content metadata;
determining, by the media search module, a plurality of incorrect search strings for each of the plurality of pieces of media content based on the plurality of names identified within the media content metadata, the plurality of unigrams and the plurality of bigrams determined from the media content metadata, and the plurality of misspellings determined of the media content metadata; and
creating, by the media search module, a dictionary comprising the plurality of incorrect search strings mapped to a corresponding correct search string used to search for each of the plurality of pieces of media content, wherein the corresponding correct search string used to search for a piece of media content of the plurality of pieces of media content comprises the corresponding title for the piece of media content of the plurality of pieces of media content.

2. The method of claim 1, wherein the media content metadata is obtained at a periodic interval from a media source storing the plurality of pieces of media content.

3. The method of claim 1, wherein the plurality of pieces of media content comprises streaming media content.

4. The method of claim 1, wherein creating the dictionary comprises creating the dictionary based upon at least one rule that limits a number of the plurality of incorrect search strings for each of the plurality of pieces of media content.

5. The method of claim 1, further comprising:
receiving, by a search user interface of the media search module, a search string for the piece of media content of the plurality of pieces of media content;
determining, by the media search module, whether the search string is in the plurality of incorrect search strings of the dictionary;
in response to determining that the search string is in the plurality of incorrect search strings of the dictionary, determining, by the media search module, for the search string, the corresponding correct search string associated with the plurality of incorrect search strings that the search string is in; and
submitting, by the media search module, a search for the piece of media content of the plurality of pieces of media content using the corresponding correct search string instead of the search string received by the search user interface.

6. A media playback device comprising
a processor; and
a memory comprising instructions for a media search module that, when executed by the processor, cause the processor to perform operations comprising
obtaining media content metadata associated with a plurality of pieces of media content available for playback by the media playback device, wherein the media content metadata comprises a corresponding title of each of the plurality of pieces of media content,
identifying a plurality of names within the media content metadata,
removing a plurality of stop words from the media content metadata,
determining a plurality of unigrams and a plurality of bigrams from the media content metadata,
determining a plurality of misspellings of the media content metadata,
determining a plurality of incorrect search strings for each of the plurality of pieces of media content based on the plurality of names identified within the media content metadata, the plurality of unigrams and the plurality of bigrams determined from the media content metadata, and the plurality of misspellings determined of the media content metadata, and
creating a dictionary comprising the plurality of incorrect search strings mapped to a corresponding correct search string used to search for each of the plurality of pieces of media content, wherein the corresponding correct search string used to search for a piece of media content of the plurality of pieces of media content comprises the corresponding title for the piece of media content of the plurality of pieces of media content.

7. The system media playback device of claim 6, wherein the media content metadata is obtained at a periodic interval from a media source storing the plurality of pieces of media content.

8. The media playback device of claim 6, wherein the plurality of pieces of media content comprises streaming media content.

9. The media playback device of claim 6, wherein creating the dictionary comprises creating the dictionary based upon at least one rule that limits a number of the plurality of incorrect search strings for each of the plurality of pieces of media content.

10. The media playback device of claim 6, wherein the operations further comprise:
receiving a search string for the piece of media content of the plurality of pieces of media content;
determining whether the search string is in the plurality of incorrect search strings of the dictionary;
in response to determining that the search string is in the plurality of incorrect search strings of the dictionary, determining, for the search string, the corresponding correct search string associated with the plurality of incorrect search strings that the search string is in; and submitting a search for the piece of media content of the plurality of pieces of media content using the corresponding correct search string instead of the search string received.

11. A computer-readable storage medium comprising computer-executable instructions that, when executed by a processor of a media playback device, cause the processor to perform operations comprising:
 obtaining media content metadata associated with a plurality of pieces of media content available for playback by the media playback device, wherein the media content metadata comprises a corresponding title of each of the plurality of pieces of media content;
 identifying a plurality of names within the media content metadata;
 removing a plurality of stop words from the media content metadata;
 determining a plurality of unigrams and a plurality of bigrams from the media content metadata;
 determining a plurality of misspellings of the media content metadata;
 determining a plurality of incorrect search strings for each of the plurality of pieces of media content based on the plurality of names identified within the media content metadata, the plurality of unigrams and the plurality of bigrams determined from the media content metadata, and the plurality of misspellings determined of the media content metadata; and
 creating a dictionary comprising the plurality of incorrect search strings mapped to a corresponding correct search string used to search for each of the plurality of pieces of media content, wherein the corresponding correct search string used to search for a piece of media content of the plurality of pieces of media content comprises the corresponding title for the piece of media content of the plurality of pieces of media content.

12. The computer-readable storage medium of claim 11, wherein the media content metadata is obtained at a periodic interval from a media source storing the plurality of pieces of media content.

13. The computer-readable storage medium of claim 12, wherein the plurality of pieces of media content comprises streaming media content.

14. The computer-readable storage medium of claim 11, wherein creating the dictionary comprises creating the dictionary based upon at least one rule that limits a number of the plurality of incorrect search strings for each of the plurality of pieces of media content.

15. The computer-readable storage medium of claim 11, wherein the operations further comprise:
 receiving a search string for the piece of media content of the plurality of pieces of media content;
 determining whether the search string is in the plurality of incorrect search strings of the dictionary;
 in response to determining that the search string is in the plurality of incorrect search strings of the dictionary, determining, for the search string, the corresponding correct search string associated with the plurality of incorrect search strings that the search string is in; and
 submitting a search for the piece of media content of the plurality of pieces of media content using the corresponding correct search string instead of the search string received.

\* \* \* \* \*